United States Patent
Golding

(10) Patent No.: US 10,404,778 B2
(45) Date of Patent: Sep. 3, 2019

(54) SESSION HAND-OFF FOR MOBILE APPLICATIONS

(71) Applicant: Walmart Apollo, LLC, Bentonville, AR (US)

(72) Inventor: Paul Golding, Cupertino, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 234 days.

(21) Appl. No.: 14/964,513

(22) Filed: Dec. 9, 2015

(65) Prior Publication Data

US 2017/0171322 A1     Jun. 15, 2017

(51) Int. Cl.
*G06F 15/16* (2006.01)
*H04L 29/08* (2006.01)
(Continued)

(52) U.S. Cl.
CPC .......... *H04L 67/025* (2013.01); *H04L 51/18* (2013.01); *H04L 67/148* (2013.01); *H04L 67/38* (2013.01);
(Continued)

(58) Field of Classification Search
CPC ..... H04L 67/42; H04L 67/025; H04L 67/125; H04L 67/148; H04L 67/38; H04L 51/18; H04L 51/38; H04N 5/23206; H04N 5/23222; H04N 5/23216; H04N 5/23245; G06F 17/30905; G06F 17/3089; G06F 17/211; G06F 8/36
See application file for complete search history.

(56) References Cited

U.S. PATENT DOCUMENTS 5,913,217 A    6/1999  Alger
7,024,394 B1   4/2006  Ashour
(Continued)

FOREIGN PATENT DOCUMENTS

EP    1077414    2/2001
EP    1202187    5/2002

OTHER PUBLICATIONS

IBM, Session Management Support, as available at https://www.ibm.com/support/knowledgecenter/SSAW57__8.5.5/com.ibm.websphere.nd.multiplatform.doc/ae/cprs_sesm.html , retrieved on Nov. 27, 2018, 4 pages.
(Continued)

*Primary Examiner* — Kyung H Shin
(74) *Attorney, Agent, or Firm* — Patterson Thuente Pedersen, P.A.

(57) ABSTRACT

A hand-off service enables seamless sharing of session data of an online session between a server and a client with additional clients in an application, e.g., art application used for finding décor items. A user can request a server, using a first device, e.g., desktop, for access information for accessing the art application using a second device, e.g., smartphone. When the second device accesses the server using the access information, the server generates a unique storage address space that is connected to a session between the server and the first device. The user can upload a digital asset, e.g., image of a room captured using the smartphone, to the unique address and the server automatically renders the digital asset on the first device. The server can also render another digital asset, e.g., an art image, within the setting image.

35 Claims, 7 Drawing Sheets

(51) Int. Cl.
*H04L 12/58* (2006.01)
*H04L 29/06* (2006.01)
*H04N 5/232* (2006.01)
*H04N 5/225* (2006.01)

(52) U.S. Cl.
CPC ..... *H04N 5/23206* (2013.01); *H04N 5/23222* (2013.01); *H04L 51/38* (2013.01); *H04N 5/2252* (2013.01); *H04N 5/2256* (2013.01); *H04N 5/23216* (2013.01)

(56) References Cited

U.S. PATENT DOCUMENTS

| | | |
|---|---|---|
| 7,111,291 B2 | 9/2006 | Loy |
| 7,720,686 B2 | 5/2010 | Volk |
| 7,739,512 B2 | 6/2010 | Hawkes |
| 8,255,247 B2 | 8/2012 | Mésser |
| 8,553,867 B2 | 10/2013 | Callanan |
| 8,583,790 B2 | 11/2013 | Nalla |
| 8,671,025 B2 | 3/2014 | Mehra |
| 8,782,014 B2 | 7/2014 | Shepard |
| 9,706,012 B2* | 7/2017 | Tanimoto ............... H04L 67/025 |
| 9,769,368 B1* | 9/2017 | Morford ............ H04N 5/23206 |
| 2001/0034668 A1 | 10/2001 | Whitworth |
| 2002/0111870 A1 | 8/2002 | Chinnappan |
| 2003/0016250 A1 | 1/2003 | Chang |
| 2003/0036997 A1 | 2/2003 | Dunne |
| 2003/0069878 A1 | 4/2003 | Wise |
| 2004/0187015 A1 | 9/2004 | Geer |
| 2005/0210019 A1 | 9/2005 | Uehara |
| 2005/0262075 A1 | 11/2005 | Beartusk |
| 2006/0122915 A1 | 6/2006 | Allen |
| 2007/0067179 A1 | 3/2007 | Kerr |
| 2007/0143082 A1 | 6/2007 | Degnan |
| 2007/0180468 A1 | 8/2007 | Gill |
| 2008/0071559 A1 | 3/2008 | Arrasvuori |
| 2009/0043864 A1 | 2/2009 | Shetty |
| 2009/0094315 A1 | 4/2009 | Nadel |
| 2009/0016995 A1 | 7/2009 | Banga |
| 2009/0282468 A1 | 11/2009 | Banga |
| 2010/0149217 A1 | 6/2010 | Mielke |
| 2010/0293281 A1 | 11/2010 | Tsimelzon |
| 2011/0093613 A1 | 4/2011 | Banes |
| 2011/0173251 A1 | 7/2011 | Sandhu |
| 2012/0019564 A1 | 1/2012 | Almgren |
| 2012/0166299 A1 | 6/2012 | Heinstein |
| 2012/0324365 A1 | 12/2012 | Momchilov |
| 2013/0086652 A1 | 4/2013 | Kavantzas |
| 2013/0174015 A1* | 7/2013 | Jeff L ............... G06F 17/30905 715/234 |
| 2013/0212420 A1 | 8/2013 | Lawson |
| 2013/0305036 A1 | 11/2013 | Vos |
| 2014/0013375 A1 | 1/2014 | Giladi |
| 2014/0139700 A1* | 5/2014 | Sato ................... H04N 5/23222 348/222.1 |
| 2014/0153422 A1 | 6/2014 | Nambiar |
| 2014/0215120 A1 | 7/2014 | Inmar |
| 2014/0222930 A1 | 8/2014 | Gangadharan |
| 2014/0223011 A1 | 8/2014 | Smith |
| 2014/0223452 A1 | 8/2014 | Santhanam |
| 2014/0304421 A1 | 10/2014 | Karaoguz |
| 2015/0088978 A1 | 3/2015 | Motukuru |
| 2016/0036818 A1 | 2/2016 | Patesaria |
| 2016/0219089 A1 | 7/2016 | Murthy |
| 2016/0285976 A1 | 9/2016 | Chan |
| 2017/0094005 A1 | 3/2017 | Charles |
| 2017/0134357 A1 | 5/2017 | Ohlsson |
| 2017/0364601 A1 | 12/2017 | Charles |

OTHER PUBLICATIONS

International Preliminary Report on Patentability, Application No. PCT/US2016/054019, dated Apr. 12, 2018, 7 pages.
International Search Report and Written Opinion, Application No. PCT/US2016/054019, dated Dec. 8, 2016, 15 pages.
Universally Unique Identifier (UUID) (RFC 4122), as available on Feb. 2, 2019 at https://www.famkruithof.net/uuid/uuidgen, 1 page.
IBM Knowledge Center, http://www .01 . ibm. com/support/knowledgecenter/SSAW5 7 _ 8. 5. 5/com.ibm.websphere.nd.doc/ae/cprs_sesm.html, dated Jul. 15, 2015, 1 page.
International Search Report, International Application No. PCT/US2015/063721, dated Feb. 9, 2016, 2 pages.
Written Opinion, International Application No. PCT/US2015/063721, dated Feb. 9, 2016, 8 pages.
European Search Report , Application No. 12165061.8, completed Oct. 16, 2012, 2 pages.
European Search Report , Application No. 11195726.2, completed Jun. 5, 2012, 3 pages.
International Preliminary Report on Patentability, Application No. PCT/US2015/063721, dated Jun. 6, 2017, 10 pages.

* cited by examiner

SESSION HAND-OFF FOR MOBILE APPLICATIONS

BACKGROUND

Current tools for finding digital assets, e.g., décor items such as an art, rugs, decorating paint, furnishings, fashion, an image of an artwork, etc. are typically naïve. They do not address the problem of finding different décor items that match or harmonize to a particular required style or to a particular setting, e.g., a living room of a particular person. Some tools enable a user to determine whether a particular décor item matches the décor of the room. The tools typically require the user to upload an image of the setting, e.g., an image of the living room, in which the particular décor item may be installed. The user can place the image of the particular décor item on the image of the setting and determine whether the user likes the particular décor item.

One of the problems with such tools is that the process of uploading the image of the setting is inconvenient. For example, consider that the user is using a computing device such as a desktop, to browse through a set of décor items presented by an art application, e.g., implemented as online website, and the user wants to determine how a particular décor item looks in his/her room. To upload the image of the room to the art application, the user may need the image of the room stored at the desktop, or at some other location, e.g., a cloud storage service, from which the user can upload. If the user does not have the image of the room stored at an accessible location, the user may not be able to upload the image. Further, the desktop may not have a camera for the user to capture the image of the room, or even if the desktop has a camera, it may not be convenient to take a picture of the room using the desktop's camera.

One of the alternatives is to capture the image of the setting using a mobile computing device such as a "smartphone" and transfer the image from the smartphone to the desktop. The user can transfer the image to the desktop using various means, or upload the image to the cloud storage service from the smartphone first and then download it to the desktop, and upload the image from the desktop to the art application. The above process of uploading the image of the setting to the art application is time-consuming, laborious and inconvenient.

BRIEF DESCRIPTION OF THE DRAWINGS

One or more embodiments of the disclosed techniques are illustrated by way of example and not limitation in the figures of the accompanying drawings, in which like references indicate similar elements.

DETAILED DESCRIPTION

Figure 1:
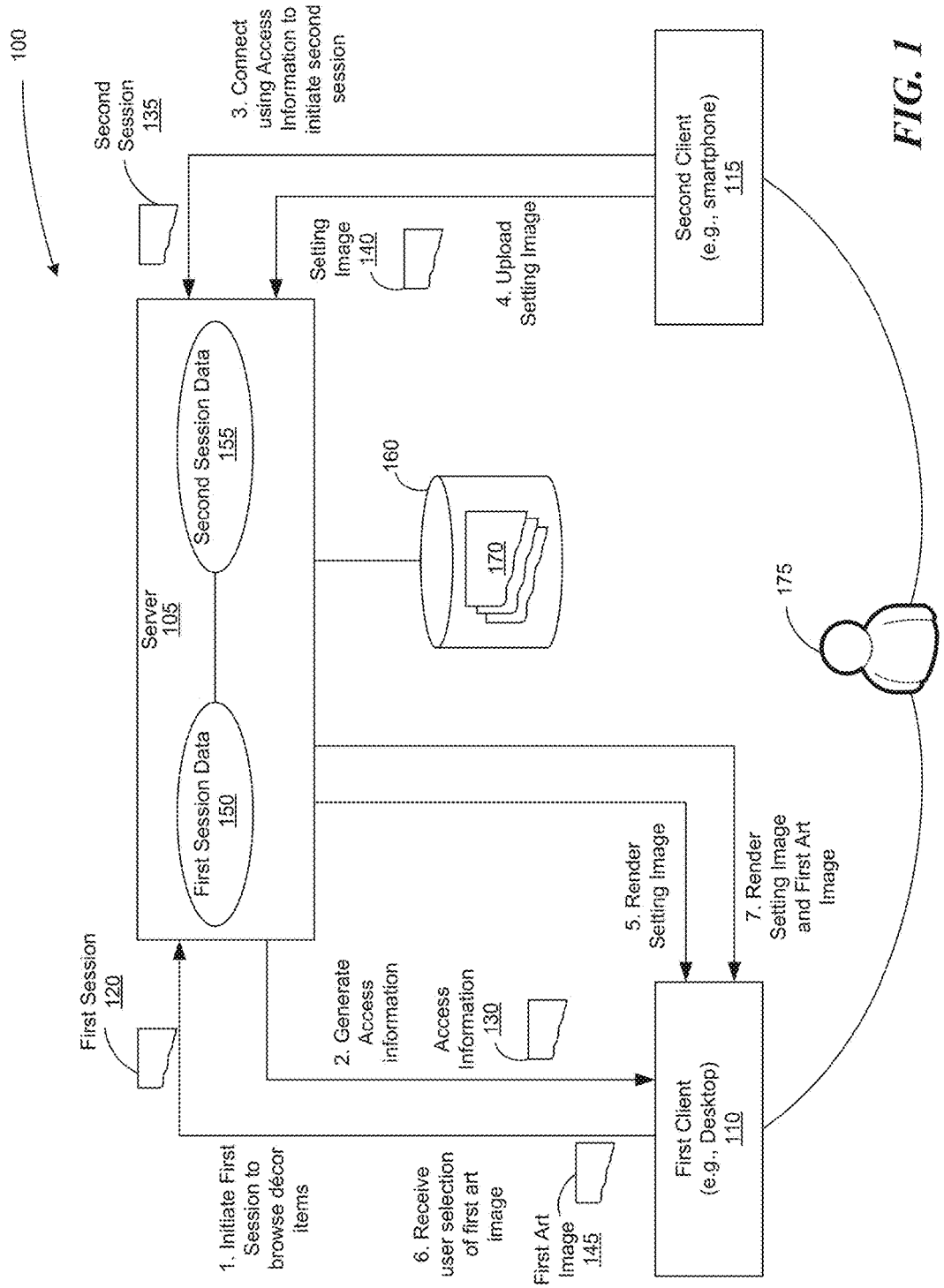
FIG. 1 is an environment in which the disclosed embodiments can be implemented.

Disclosed here are embodiments for a hand-off service that enables sharing session data of an online session between a server computing device ("server") and a client computing device ("client") seamlessly with one or more additional clients. The hand-off service can be implemented in applications for transmitting digital assets between clients seamlessly. A digital asset can be a multimedia file, e.g., an image file, a video file, an audio file, a computer generated imagery (CGI) file. For example, the hand-off service can be implemented in an art application that is used for finding digital assets such as décor items (or, at least in some cases, a digital representation of a décor item). The art application can enable a user to find a décor item that the user thinks matches with a particular setting, e.g., a living room, a bedroom or a lobby. The art application can allow the user to upload an image of the setting, and render a particular décor item within the image of the setting. The user may then view how the particular décor item may look in the setting.

A décor item can be any real world object, e.g., an artwork, a painting, a picture, an image of an art, an artifact, an architectural piece, an arrangement of artworks, a color selection, a décor of a room, a rug, a mat, furnishings, clothes, jewelry, fashion, car interiors, flower arrangements, gardens. An image of a setting can include an image of an arrangement of the décor items, e.g., an image of a room having the décor items, an image of a car having the décor accessories, an image of clothes.

The hand-off service provides a convenient way to share the digital assets between two or more clients seamlessly. For example, consider that the user is using a first client such as a desktop, to browse through a set of décor items presented by the art application, e.g., implemented as online website at a server. Further, consider that the server establishes a first session with the first client, e.g., when the first client accesses the server for the first time and/or the user logs into the art application. The user may want to determine how a particular décor item looks in a particular setting. The user can upload an image of the setting to the art application from a storage location that is accessible by the art application, e.g., a local storage device of the first client, a cloud storage service. If the user does not have the image of the setting stored at an accessible location, the art application allows the user to conveniently upload the image of the setting from a second client, e.g., a smartphone. The user can indicate to the art application that the user would like to upload the image of the setting from the second client. The hand-off service of the art application can generate access information, e.g., a hyperlink, an access code, at the first client using which the user can access the art application from the second client. When the user accesses the art application from the second client using the access information, the server establishes a second session with the second client and connects the second session to the first session. In some embodiments, connecting the second session to the first session includes generating a unique storage address for storing session data associated with the second session when the second client accesses the server using the access information and making the session data stored at the unique storage address available to the first session.

Further, upon accessing the server using the access information from the second client, the art application can automatically open the camera application on the second client inviting the user to capture an image of the setting. After the user captures the image of the setting, the image of the setting is automatically generated on the first client, e.g., because the first session and the second session are connected to each other. In some embodiments, connecting the first and second sessions enables data associated with at least one of the sessions to be shared with another of the sessions. For example, when the user captures the image of the setting using the second client, the second client uploads the image of the setting to the server as part of the second session, which can be stored in second session data. Since the second session is connected to the first session, the server can make the image of the setting in the second session data available to the first session, e.g., by copying the image to the first session data or by notifying the first session of the new image in the second session data. Upon receiving an update, e.g., the image of the setting, to the first session data and/or the second session data, the server automatically generates the updated image of the setting at the first client. That is, the hand-off service of the art application enables the user to conveniently upload the image of the setting to the art application at a first client from a second client, e.g., with none-to-minimum intervention from the user.

After the art application renders the image of the setting on the first client, the art application can generate the image of the particular décor item with the image of the setting. For example, the art application can superimpose or overlay the image of the particular décor item on the image of the setting. In some embodiments, the art application can also facilitate transmitting the images of the décor items from the first client to the second client. The art application can render an image of the décor item within the image of the setting on the second client. In some embodiments, the art application supports augmented reality (AR) visualization of the décor items. In some embodiments, the user can "push" the particular décor item from the first client to the second client and instantaneously view the image of the particular décor item overlaid on a live view of any desired setting. The art application can overlay the image of the décor item on a live view of the image of the setting generated by the second client. For example, the user can point the smartphone camera to a setting, e.g., a wall of the living room, where the user intends to install the particular décor item, and the art application can overlay the image of the décor item on a live view of the wall rendered in a display screen of the smartphone. The hand-off service facilitates such a sharing of the images between various clients by handing-off the session from one client to another client.

The client can be any of a desktop, a laptop, a tablet PC, a smartphone, a wearable device, etc. The art application can be implemented in a number of configurations. For example, the art application can be implemented as online web site that can be accessed using a web browser from a client. In another example, the art application can have a client portion and a server portion, where the client portion can be installed at the client, e.g., as an "app," and the server portion can be installed at the server. Further, the app can be of different versions for different type of clients. For example, the app can be of a first version for a desktop client, a second version for a smartphone client, etc. The user can access the art application via the web browser and/or an app on the client.

Turning now to the figures, FIG. 1 is an environment in which the disclosed embodiments can be implemented. The environment 100 includes a server 105 at which the art application is implemented. The art application can allow a user 175 to find a décor item that the user 175 thinks matches with a particular setting, e.g., a living room, a bedroom or a lobby. The server 105 can allow the user 175 to upload an image of the setting, e.g., setting image 140, and render a particular décor item the user has indicated interest in with the setting image 140 at a client, e.g., a first client 110. For example, the server 105 can render the particular décor item by overlaying an image of the particular décor item, e.g., a first image 145, on the setting image 140. The user 175 may then view how the particular décor item may look in the setting.

As described above, the art application can be implemented in a number of configurations. For example, the art application can be implemented as online web site that can be accessed at the server 105 using a web browser from a client, e.g., the first client 110. In another example, the art application can have a client portion and a server portion in which the client portion can be installed at the client, e.g., as an app, and the server portion can be installed at the server 105. Further, the app can be of different versions for different type of clients. For example, the app can be of a first version for a desktop client, a second version for a smartphone client, etc.

The client can be any of a desktop, a laptop, a tablet PC, a smartphone, a wearable device, etc. In some embodiments, the first client 110 is a desktop and the second client 115 is a smartphone. The clients can access the server 105 via a communication network (not illustrated), e.g., Internet, local area network (LAN). The first client 110 and the second client 115 can be associated with the user 175. In some embodiments, the first client 110 and the second client 115 are associated with different users.

The server 105 is associated with a storage system 160, e.g., a database, that can store a variety of data. For example, the storage system 160 can store user profile data of the users of the art application. The storage system 160 can store images of the décor items 170 that the user can view and/or purchase. The storage system 160 can store a variety of information that describe the décor items, e.g., manufacturer name of a décor item, an artist name of the décor item, dimensions and/or size of the décor item, colors of the décor item, an accent, visualness, a mood, a style, a theme. For example, the style can be "Romantic," or "Abstract. The storage system 160 can also store information regarding various merchants associated with the art application who want to sell their décor items to the users through the art application. The storage system 160 can be implemented as a local database or a remote database. Further, the storage system 160 can be implemented as a distributed file system.

The server 105 can manage a client access to the art application as a session. In some embodiments, a session is a semi-permanent interactive information interchange, also referred to as a dialogue, a conversation or a meeting, between two or more communicating devices, or between a computing device and a user. A session can be set up or established at a certain point in time, e.g., when the user 175 logs in to the art application at the server 105, and then deleted at some later point, e.g., when the user 175 logs out of the art application, the user 175 does not perform any action in the art application for a predefined duration, the user 175 closes the web browser application from which the art application is being accessed. An established communication session may involve more than one communication in each direction. A session is typically stateful, meaning that at least one of the communicating entities may need to save information about the session history, e.g., as session data, in order to be able to communicate during the session.

The user 175 may access the art application at the server 105 using the first client 110, e.g., to view and/or purchase one or more décor items, e.g., art images. The server 105 can establish a first session 120 between the first client 110 and the server 105 or the user 175 and the server 105. In some embodiments, the server 105 can store the session data associated with the first session 120 as first session data 150 at the server 105. The first session data 150 can include various information regarding the session such as user identification (ID) information of the user, the décor items accessed by the user in the first session 120, the décor item being currently viewed by the user 175 at the first client 110, a client ID information of the first client 110, e.g., Internet Protocol (IP) address of the first client, a session ID of the first session 120 etc. The server 105 can store the first session data 150 in a local storage, e.g., random access memory (RAM) of the server 105, or at the storage system 160.

The user 175 can select a particular image of décor item, e.g., a first art image 145, from the images of décor item 170 that the user 175 would like to view in association with a setting, e.g., a living room of the user 175. The user 175 can upload the image of the setting image 140 from the first client 110 to the server 105 if the user 175 has a copy stored at the first client 110 or at any other location from which the server 105 can receive the setting image, and the server 105 can render the first art image 145 on the setting image 140 at the first client 110.

If the user 175 does not a have a copy of the setting image 140 at any of the locations accessible by the server 105, in some embodiments, the user 175 can capture the image of the setting using the second client 115 and upload the setting image 140 to the server. For example, the user 175 can indicate to the server 105 using the first client 110 that the user 175 intends to upload the setting image from the second client 115. The server 105 generates access information 130 using which the user 175 can upload the setting image 140 to the server 105 from the second client 115. The access information 130 can be a hyperlink, an access code, etc., using which the second client 115 can connect to the server 105. In some embodiments, the access information 130 can be transmitted to one or more of the first client 110, the second client 115 or any other destination. For example, the server 105 can send the access information 130 to an email ID provided by the user 175. In another example, the server 105 can send the access information 130 as a text message to a telephone number, e.g., of the second client 115, provided by the user 175. In yet another example, the server 105 can generate the access information 130, e.g., access code, on a display screen of the first client 110.

The user 175 can connect to the server 105 from the second client 115 using the access information 130. For example, if the access information 130 is sent as a hyperlink to an email ID, the user 175 can open the email in the second client 115 and click on the hyperlink, which will invoke a web browser or an app on the second client 115 and connect to the server 105. In another example, if the access information 130 is an access code, the user 175 can open the art application app on the second client 115 and input the access code in the art application app. In yet another example, the user 175 can access the website of the art application using the web browser on the second client 115 and enter the access code in the website, and connect to the server 105.

When the second client 115 connects to the server 105 using the access information 130, the server 105 initiates a second session 135 with the second client 115 and associates the second session 135 with the first session 120. In some embodiments, connecting or associating the second session 135 to the first session 120 includes generating a unique storage address for storing second session data 155, which is session data associated with the second session 135, and making the second session data 155 stored at the unique storage address available to the first session 120. The server 105 can generate the unique address when the second client 115 accesses the server 105 using the access information 130. The server 105 can further automatically open the camera app in the second client 115 to allow the user 175 to capture the image of the setting. After the user 175 captures the image of the setting, e.g., the setting image 140, the second client 115 can automatically upload the setting image 140 to the server 105. The uploaded setting image 140 can be stored as part of second session data 155. Since the second session 135 and the first session 120 are connected to each other, the server 105 can make the setting image 140 available to the first session 120, e.g., by copying the setting image 140 from the second session data 155 to the first session data 150 and/or notifying the first session 120 of an update to the second session data 155, e.g., addition of setting image 140. In some embodiments, the server 105 may not copy the setting image 140 to the first session data 150 but notifies the first session 120 that there is new data, e.g., the setting image 140, in the associated session, e.g., the second session 135. The first session 120 then causes the server 105 to automatically generate the setting image 140 at the first client 110 with which the first session 120 is associated. Thus, the art application enables the user 175 to conveniently upload the setting image 140 to the art application at the first client 110 from the second client 115, e.g., with none-to-minimum intervention from the user 175.

Referring back to associating the first session 120 and the second session 135 with each other, in some embodiments, when two sessions are associated with or connected to each other, their corresponding session data can be shared between them. For example, the first session 120 can obtain access to the second session data 155, and similarly, the second session 135 can obtain access to the first session data 150. In another example, the first session data 150 and the second session data 155 are synchronized with each other, e.g., any changes to session data of one session is copied to the session data of the other connected session. This associating of sessions of two devices with each other can enable automatic and seamless sharing of data associated with a particular device or activity performed at the particular device with the other device.

The server 105 can associate the second session 135 to a particular session based on the access information 130. For example, the server 105 can associate the second session 135 to another session based on one or more of a session ID of the session or the user ID of the user 175 included in the access information 130. In another example, the server 105 can derive the information of the session to which the second session 135 is to be associated with based on the information included in the access information 130.

Referring back to rendering the setting image 140 at the first client 110, the server 105 can generate the first art image 145 at the first client 110 in association with the setting image 140. For example, the server 105 can superimpose or overlay the first art image 145 on the setting image 140. In some embodiments, the server 105 can determine a subset of the décor items that match with the setting. For example, the server 105 can determine the subset based on a match between color schemes of the décor items and the setting. The server 105 can use various image analysis techniques for analyzing images of décor items 170 and/or the setting image 140 to determine the color schemes of the décor items and/or the setting, respectively. In some embodiments, the server 105 can use the metadata associated with the image files of décor items 170 to determine the color scheme of the décor items.

In some embodiments, the server 105 can also generate a color palette which the user 175 can use for changing one or more colors of the at least one of the subset of the décor items, e.g., to match with the setting. The server 105 can generate the color palette based on one or more attributes of the setting. For example, if the setting has a first set of colors, a color palette having colors that match with and/or is in contrast to the first set of colors can be generated. The server 105 can determine an appropriate color palette based on match definitions that define which colors have to be generated in the color palette based on one or more attributes of the setting, e.g., a color in the setting, a theme of the setting, a type of the setting such as office, bedroom, living room, dimensions of the setting.

In some embodiments, the server 105 can also facilitate "pushing" one or more of the images of the décor items 170 selected by the user 175 at the first client 110 to the second client 115. When the user 175 pushes an image of the décor item, e.g., the first art image 145, from the first client 110, the server 105 can copy the image from the first session data 150 to the second session data 155, and automatically render the first art image 145 on the second client 115. The server 105 can render the pushed image of the décor item with the setting image 140 on the second client 115. For example, the server 105 can overlay the first art image 145 on the setting image 140 at the second client 115.

In some embodiments, the art application supports AR visualization of the décor items. In some embodiments, when the user 175 pushes the image of the particular décor item from the first client 110 to the second client 115, the user 175 can instantaneously view the image of the particular décor item overlaid on a live view of a setting. For example, the user 175 can point the camera of the second client 115 to a setting, e.g., a wall of the living room, where the user 175 intends to install the particular décor item, and the art application can overlay the image of the particular décor item on a live view of the wall rendered in a display screen of the second client 115. In some embodiments, the association between the first session 120 and the second session 135 enables an image of the décor item that is pushed from the first client 110 to be automatically and instantaneously, e.g., in near real-time, available for rendering at the second client 115.

When the image of the décor item is pushed from the first client 110 to the second client 115, the second client 115 can receive a copy of the image of the décor item and/or a link to the image of the décor stored at the server 105. The user 175 can bookmark the link, e.g., in a web browser at the second client 115, and can open the link later, e.g., even after the first session 120 expires, to view the image overlaid on the setting image or a live of the setting. The user 175 may not have to depend on the first client 110 to view the image on the second client 115.

Figure 2:
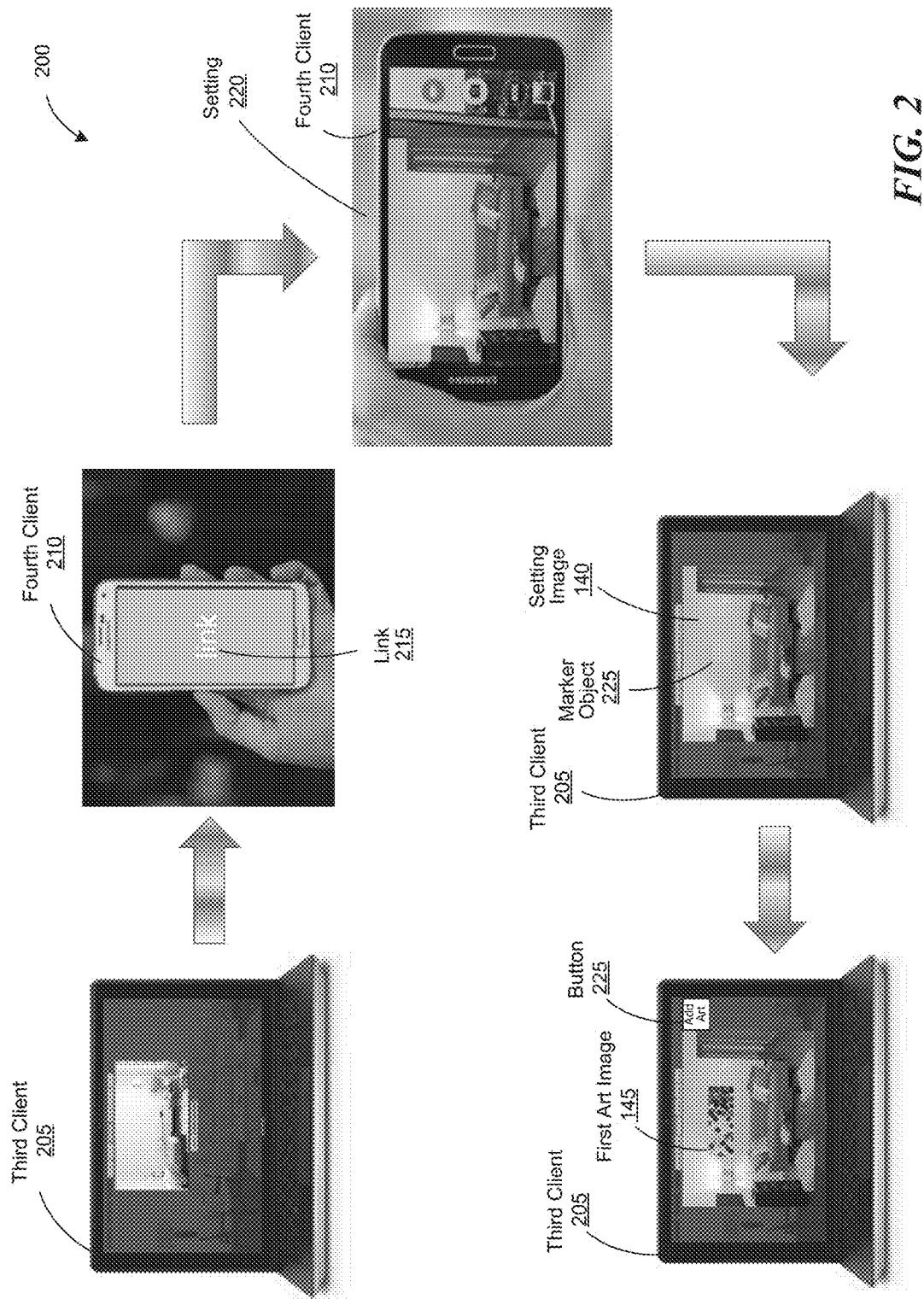
FIG. 2 is a block diagram of an example of the hand-off service implemented in the art application, consistent with various embodiments.

FIG. 2 is a block diagram of an example 200 of the hand-off service implemented in the art application, consistent with various embodiments. In some embodiments, the example 200 is implemented in the environment 100 of FIG. 1. In the example 200, the user 175 accesses the images of the décor items 170 at the server 105 using a third client 205. In some embodiments, the third client 205 is similar to the first client 110. The server 105 establishes the first session 120 with the third client 205. The user 175 indicates that the user 175 intends to upload the setting image from another client, e.g., the fourth client 210. In some embodiments, the fourth client 210 is similar to the second client 115. The server 105 generates the access information, e.g., a link 215, using which the user 175 can upload an image of the setting, e.g., setting image 140, from the fourth client 210. In some embodiments, the link 215 is similar to the access information 130. The user 175 can indicate to the server 105 that the user 175 prefers the access information as a link, and can also indicate that the link is to be sent to the fourth client 210 as a text message, or as an email. The server 105 sends the link 215 to the fourth client 210.

The user 175 can access the link 215 to connect to upload the image of the setting. In some embodiments, the link 215 is configured to automatically invoke the camera app of the fourth client 210 when the user 175 accesses the link 215. The user 175 can then point the camera of fourth client 210 to the setting 220 and capture the image of the setting 220, e.g., as the setting image 140. After the setting image 140 is captured, the fourth client 210 automatically uploads the setting image 140 to the server 105, which then automatically renders the setting image 140 on the third client 205. In some embodiments, this is made possible by associating the session between the server 105 and the third client 205 with the session between the server 105 and the fourth client 210.

The user 175 can then select a particular décor item, e.g., an art image, from the image of the décor items 170 to be viewed in association with the setting image 140. For example, the user 175 can select the button "Add art" 225 to insert the selected image, e.g., first art image 145, and the server 105 can insert the first art image 145 into the setting image 140 by overlaying the first art image 145 on the setting image 140.

In some embodiments, the server 105 can perform one or more auto corrections in rendering an image. For example, the server 105 can perform one or more corrections on the first art image 145 relative to the setting image 140 to enhance the color/contrast realism and vibrancy of the overlaying art. The auto correction process can include a color correction, e.g., white balance, size correction, etc. For example, the server 105 can perform a color correction on the first art image 145 relative to the setting image 140. In another example, the server 105 can perform a size correction on the first art image 145 so that the first art image 145 is proportionally scaled, e.g., the dimensions of the art image are proportional, to the setting. The server 105 can determine the color correction factor and/or the size correction factor to be applied to the first art image 145 based on an object, e.g., a marker object 230, in the setting 220 of known color and size, e.g., dimensions. In some embodiments, the marker object 230 is a plain white paper of size A4 or any known and common paper size. The server 105 calculates the color correction factor based on the known color values (e.g., RGB values) of the paper and the color values of the paper in the setting image 140. Similarly, the server 105 calculates the size correction factor based on the known dimensions of the paper and the dimensions of the paper in the setting image 140. The server 105 then performs the corrections on the first art image 145 based on the determined correction factors. In some embodiments, the server 105 can also perform the corrections on the setting image 140.

Figure 3:
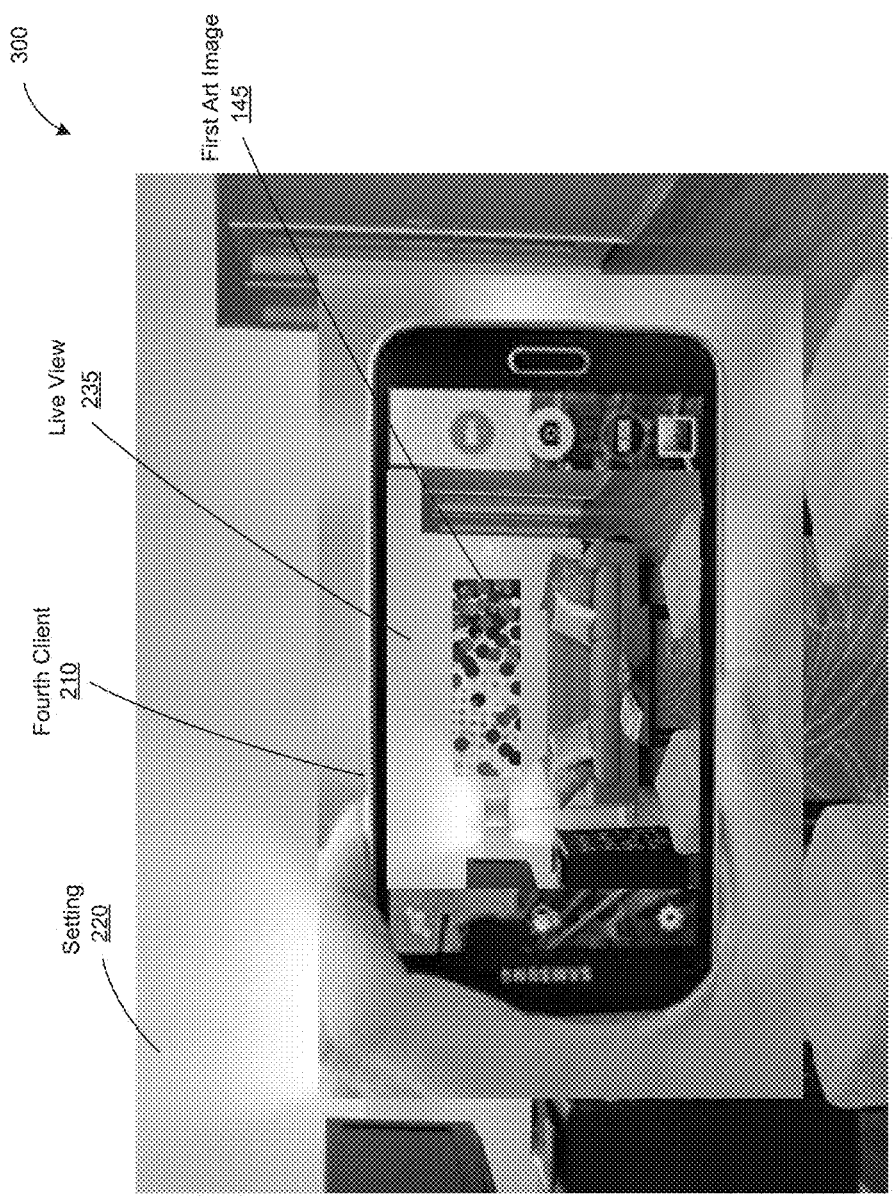
FIG. 3 is a block diagram of another example of the hand-off service implemented in the art application, consistent with various embodiments.

FIG. 3 is a block diagram of an example 300 of the hand-off service implemented in the art application, consistent with various embodiments. In some embodiments, the example 300 is implemented in the environment 100 of FIG. 1. In the example 300, the server 105 can overlay an image of the décor item, e.g., the first art image 145, on a live view 235 of a setting 220 in the fourth client 210. The first art image 145 can be an image that is stored at the fourth client 210, be an image that is "pushed" to the fourth client 210 from the third client 205, or generated by the server 105 based on the information of the first art image 145, e.g., a hyperlink, that is pushed to the fourth client 210.

As described at least with reference to FIG. 2, when the user 175 accesses the link 215 on the fourth client 210, the fourth client 210 connects to the server 105 and the server 105 establishes a session with the fourth client 210 and connects the session with a session between the server 105 and the third client 205. The server 105 can also automatically invoke the camera app of the fourth client 210 to open the camera. When the third client 205 pushes an image, e.g., the first art image 145, to the fourth client 210, the fourth client 210 automatically overlays the first art image 145 on the live view 235 of a setting, e.g., the setting 220, the camera of the fourth client 210 is pointed at. In some embodiments, the fourth client 210 may indicate to the user 175 that the fourth client 210 has received an image, and prompt the user 175 to indicate whether to display the image.

In some embodiments, the third client 205 can push information regarding the first art image 145, e.g., a hyperlink, to the fourth client 210. The fourth client 210 can retrieve the first art image 145 using the hyperlink and have the first art image 145 overlaid on the live view 235 of the setting 220. In some embodiments, the fourth client 210 can retrieve the first art image 145 using the hyperlink at any time, e.g., even after the third client 205 has disconnected from the server 105 or the session between the third client 205 and the server 105 has expired. The server 105 can also perform the auto correction process on rendering the images in the fourth client 210.

Figure 4:
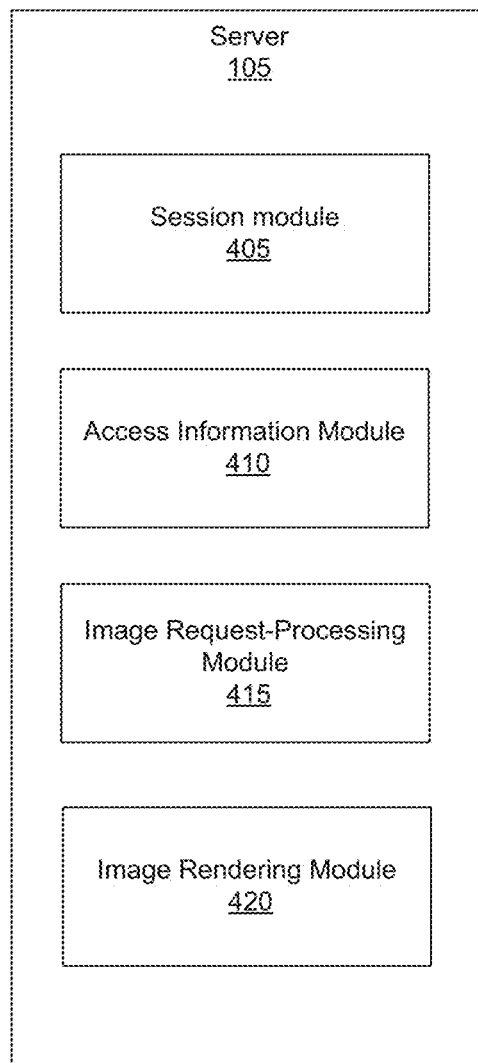
FIG. 4 is a block diagram of the server of FIG. 1, consistent with various embodiments.

FIG. 4 is a block diagram of the server of FIG. 1, consistent with various embodiments. The server 105 can be implemented as a stand-alone computer, or as a distributed system in which various modules of the server 105 are distributed over various entities in the environment 100. In some embodiments, a specified module of the server 105 can be implemented in more than one entity in the environment 100. In some embodiments, different portions of a specified module of the server 105 can be implemented in different entities in the environment 100.

The server 105 includes a session module 405 that can be configured to set up and manage sessions at the server 105 with a client, e.g., the first client 110, the second client 115, and/or a user, e.g., the user 175. The server 105 includes an access information module 410 that can be configured to generate the access information 130. The server 105 includes an image request-processing module 415 that can be configured to manage requests for retrieving images of décor items 170, selecting the first art image 145, pushing the images between the clients, uploading the setting image to the server 105, etc. The server 105 includes an image rendering module 420 that can be configured to render images, e.g., the setting image 140, the first art image 145, on the client, e.g., the first client 110, the second client 115. In some embodiments, the various modules of the server 105 perform their corresponding functions as described at least with reference to FIGS. 1-3. Additional details with respect to the functionalities of the above modules are described at least with reference to FIGS. 5 and 6, and the following paragraphs.

Figure 5:
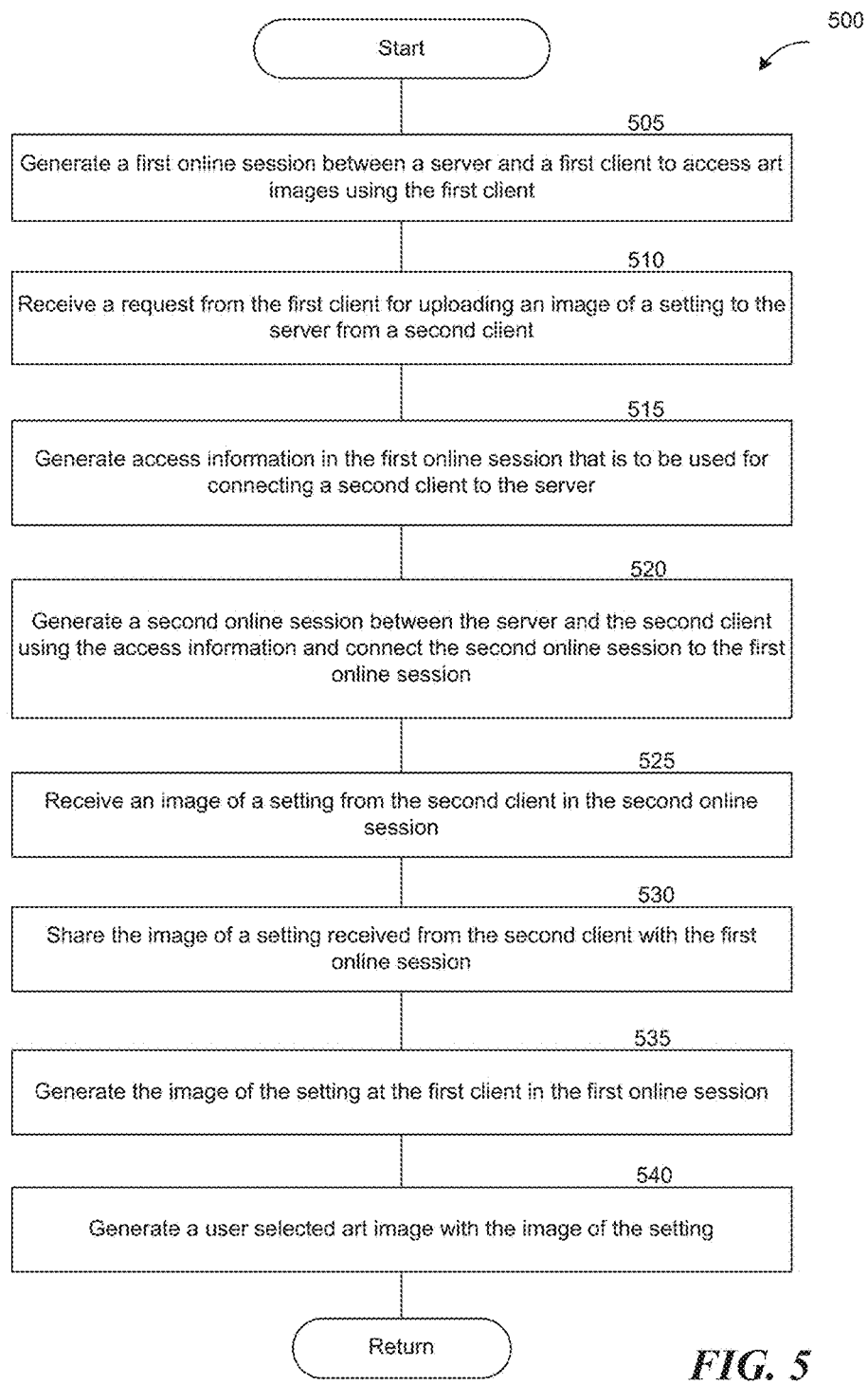
FIG. 5 is a flow diagram of a process for handing-off a session between the server and a client to another client, consistent with various embodiments.

FIG. 5 is a flow diagram of a process 500 for handing-off a session between the server and a client to another client, consistent with various embodiments. In some embodiments, the process 500 can be implemented in the environment 100 of FIG. 1. At block 505, the session module 405 establishes a first online session 120 between the server 105 and the first client 110. In some embodiments, the server 105 establishes the first online session 120 when the user 175 logs into the art application at the server 105. The user 175 may access art images of the art application using the first client 110. The server 105 may record the user activity performed during the first online session 120 as part of the first session data 150.

At block 510, the image request-processing module 415 receives a request from the first client 110 for uploading an image of a setting, e.g., setting 220 of FIG. 2, to the server 105 from the second client 115.

At block 515, the access information module 410 generates the access information 130 in the first online session 120, which is to be used at the second client 115 for connecting to the art application. The access information 130 can be a hyperlink, an access code, etc., that can be used at the second client for connecting the second client 115 to the server 105.

At block 520, the session module 405 generates a second online session 135 between the server 105 and the second client 115 using the access information. The session module 405 also connects the second online session 135 to the first online session 120. In some embodiments, connecting two sessions can include sharing session data of at least one of the two sessions with another of the two sessions. In some embodiments, connecting the second session 135 to the first session 120 includes generating a unique storage address for storing the second session data 155 when the second client 115 accesses the server 105 using the access information 130 and making the second session data 155 stored at the unique storage address available to the first session 120. The session data may be shared without an intervention from the user. For example, an activity performed by the user in the second client 115 may be automatically shared with the first client 110 without any or minimum intervention from the user.

After the second online session 135 is generated, the image request-processing module 415 can automatically activate the camera of the second client 115, e.g., by opening the camera app of the second client 115. The user 175 may then capture an image of the setting 220, e.g., as setting image 140.

At block 525, the image request-processing module 415 receives an image of the setting, e.g., setting image 140, from the second client 115. The image request-processing module 415 may store the setting image 140 as part of the second session data 155, which is session data associated with the second online session 135.

At block 530, the session module 405 shares the setting image 140 received from the second online session 135 with the first online session 120 automatically. For example, the session module 405 can copy the setting image 140 from the second session data 155 to the first session data 150 and/or notify the first online session 120 of the addition of the setting image 140 to the second session data 155 and make the second session data 155 accessible to the first online session 120.

At block 535, the image rendering module 420 generates the setting image 140, which is received from the second online session 135 that is connected to the first online session 120, at the first client 110 in the first online session 120 automatically.

At block 540, the image rendering module 420 can render a user selected art image, e.g., the first art image 145, with the setting image 140. In some embodiments, the image rendering module 420 renders both the images by overlaying the first art image 145 on the setting image 140. The image rendering module 420 can also perform the auto correction process in rendering the images at the first client 110.

Figure 6:
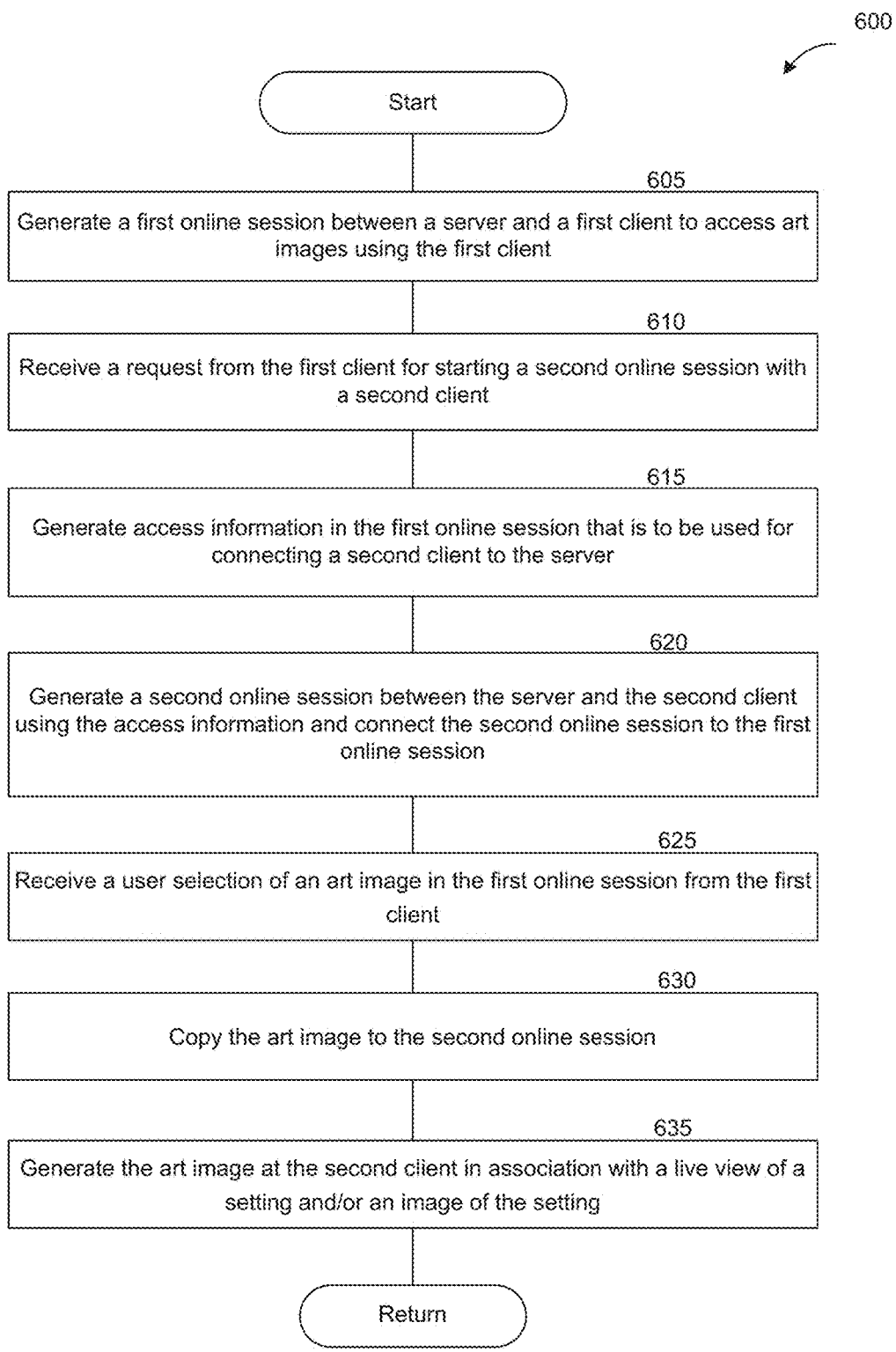
FIG. 6 is a flow diagram of another process for handing-off a session between the server and a client to another client, consistent with various embodiments.

FIG. 6 is a flow diagram of a process 600 for handing-off a session between the server and a client to another client, consistent with various embodiments. In some embodiments, the process 600 can be implemented in the environment 100 of FIG. 1. At block 605, the session module 405 establishes a first online session 120 between the server 105 and the first client 110. In some embodiments, the server 105 establishes the first online session 120 when the user 175 logs into the art application at the server 105. The user 175 may access art images of the art application using the first client 110. The server 105 may record the user activity performed during the first online session 120 as part of the first session data 150.

At block 610, the session module 405 receives a request from the first client 110 for starting a second online session for the second client 115.

At block 615, the access information module 410 generates the access information 130 in the first online session 120, which is to be used at the second client 115 for connecting to the art application. The access information 130 can be a hyperlink, an access code, etc., that can be used at the second client for connecting the second client 115 to the server 105.

At block 620, the session module 405 generates a second online session 135 between the server 105 and the second client 115 using the access information. The session module 405 also connects the second online session 135 to the first online session 120.

After the second online session 135 is generated, the image request-processing module 415 can automatically activate the camera of the second client 115, e.g., by opening the camera app of the second client 115.

At block 625, the image request-processing module 415 receives a user selection of an image of a décor item, e.g., the first art image 145, from the first client 110 in the first online session 120 for the first art image 145 to be pushed to the second client 115.

At block 630, the session module 405 can push the first art image 145 to the second client 115 by sharing the first art image 145 with the second online session 135.

At block 635, the image rendering module 420 can render the first art image 145 at the second client 115 in the second online session 135. For example, the image rendering module 420 can render the first art image 145 with the setting image 140 and/or a live view of the setting 220, e.g., at least as described with reference to FIG. 3. The image rendering module 420 can also perform the auto correction process in rendering the images at the second client 115.

Figure 7:
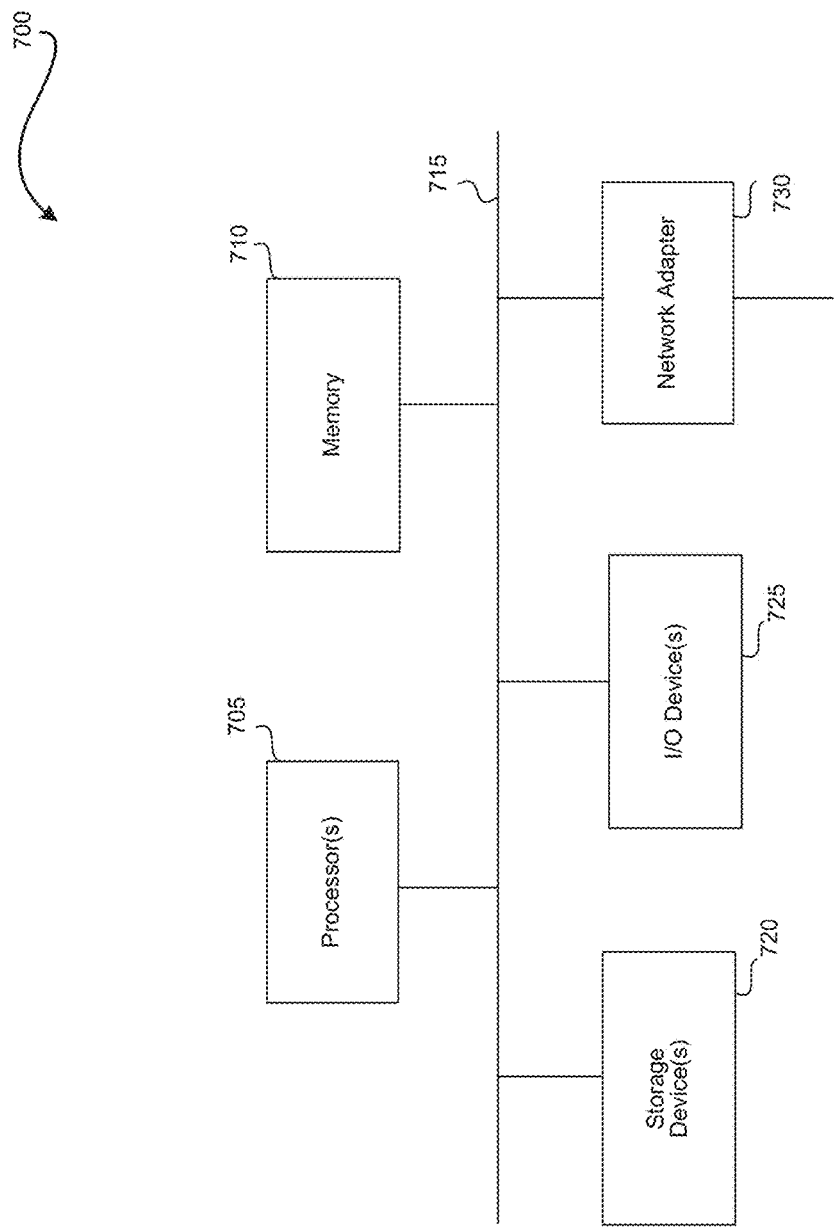
FIG. 7 is a block diagram of a processing system that can implement operations of the disclosed embodiments.

FIG. 7 is a block diagram of a computer system as may be used to implement features of the disclosed embodiments. The computing system 700 may be used to implement any of the entities, components or services depicted in the examples of the foregoing figures (and any other components and/or modules described in this specification). The computing system 700 may include one or more central processing units ("processors") 705, memory 710, input/output devices 725 (e.g., keyboard and pointing devices, display devices), storage devices 720 (e.g., disk drives), and network adapters 730 (e.g., network interfaces) that are connected to an interconnect 715. The interconnect 715 is illustrated as an abstraction that represents any one or more separate physical buses, point to point connections, or both connected by appropriate bridges, adapters, or controllers. The interconnect 715, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 710 and storage devices 720 are computer-readable storage media that may store instructions that implement at least portions of the described embodiments. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non transitory" media) and computer-readable transmission media.

The instructions stored in memory 710 can be implemented as software and/or firmware to program the processor(s) 705 to carry out actions described above. In some embodiments, such software or firmware may be initially provided to the processing system 700 by downloading it from a remote system through the computing system 700 (e.g., via network adapter 730).

The embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

I claim:

1. A method comprising:
generating, by a server computing device, a first online session between the server computing device and a first computing device associated with a user, the first online session enabling the user to access a plurality of digital assets using the first computing device;
receiving, by the server computing device and from the first computing device, a request for uploading a specified digital asset from a second computing device to the server computing device and further receiving a request for a selected artwork from among the plurality of digital assets;
generating, by the server computing device, access information for uploading the specified digital asset to the server computing device from the second computing device, wherein a session module connects the second online session to the first online session by generating a unique storage address for storing the second session data and making the second session data automatically available to the first session without any intervention from the user;
generating, by the server computing device, a second online session between the server computing device and the second computing device in response to the user selecting the access information, the access information connecting the second online session to the first online session;
receiving, at the server computing device, the specified digital asset from the second computing device as part of the second online session; and
generating, by the server computing device, a rendered image combining the selected artwork and the specified digital asset from the first computing device in the first online session.

2. The method of claim 1, wherein generating the access information includes generating, by the server computing device, a link, which when accessed using the second computing device, initiates the second online session.

3. The method of claim 1, wherein generating the access information includes generating, by the server computing device, an access code, which when input at an online website accessed using the second computing device, initiates the second online session.

4. The method of claim 1, wherein generating the access information further includes transmitting the access information to the second computing device.

5. The method of claim 1, wherein generating the second online session includes:
generating a unique address to store session data associated with the second online session, and
making the session data stored at the unique address available to at least one of the first online session and the second online session automatically.

6. The method of claim 5, wherein making the session data available includes automatically transmitting from the first computing device at least one of the digital assets being accessed by the user in the first online session to the second computing device using the session data.

7. The method of claim 1, wherein the digital assets include a plurality of art images, and wherein the specified digital asset includes an image of a setting.

8. The method of claim 7 further comprising:
receiving, at the server computing device, a user selection of a first art image of the art images in the first online session; and
generating, by the server computing device and at the first computing device, the first art image overlaid on the image of the setting to generate a combined image.

9. The method of claim 8 further comprising:
automatically transmitting the combined image to the second online session for the combined image to be viewed at the second computing device.

10. The method of claim 8, wherein generating the combined art image includes determining, based on an analysis of the image of the setting, at least one of a white balance correction factor or a size correction factor to be applied to the first art image.

11. The method of claim 10, wherein the determining is performed based on a marker object in the setting whose size and color is predefined.

12. The method of claim 10, wherein generating the combined art image includes adjusting a white balance of the first art image based on the white balance correction factor.

13. The method of claim 10, wherein generating the combined art image includes resizing the first art image based on the size correction factor.

14. The method of claim 7 further comprising:
determining, at the server computing device, a subset of the art images that matches with the image of the setting; and
generating, by the server computing device and at the first computing device, at least one of the subset of the art images superimposed on the image of the setting.

15. The method of claim 14, wherein determining the subset of the art images includes determining the subset of the art images based on a match between color schemes of the art images and the image of the setting.

16. The method of claim 14 further comprising:
generating, by the server computing device and at the first computing device, a color palette to be used for changing one or more colors of the at least one of the subset of the art images.

17. The method of claim 16, wherein generating the color palette includes generating the color palette automatically based on one or more attributes of the image of the setting.

18. The method of claim 1 further comprising:
receiving, at the server computing device, a user selection of a first digital asset of the digital assets in the first online session;
transmitting, by the server computing device and from the first online session, the first digital asset to the second online session for generation at the second computing device; and
generating the first digital asset at the second computing device in the second online session.

19. The method of claim 18, wherein generating the first digital asset includes generating an art image by overlaying the art image on a live view of a setting captured by the second computing device.

20. The method of claim 18 further comprising:
storing information regarding the first digital asset at the second computing device using which the first digital asset can be generated at the second computing device even after the first online session or the second online session expires.

21. The method of claim 1, wherein the first computing device and the second computing device are at different physical locations.

22. A non-transitory computer-readable storage medium storing computer-readable instructions, comprising:
instructions for generating, by a server computing device, a first online session between the server computing device and a first computing device to access a plurality of art images using the first computing device;
instructions for generating a second online session between the server computing device and a second computing device, wherein the second online session is generated using access information that is generated by the first online session, the access information connecting the second online session and the first online session by generating a unique storage address for storing art images data, the unique storage address automatically accessible by the first online session without any intervention from a user associated with the first computing device;
instructions for copying, at the server computing device and from the first online session, a first art image of the art images to the second online session to make the first art image available for generation at the second computing device, the first art image selected by the user; and
instructions for generating, by the server computing device and automatically, the first art image at the second computing device by overlaying the first art image on a live view of a setting captured by the second computing device.

23. The computer-readable storage medium of claim 22 further comprising:
instructions for storing information regarding the first art image at the second computing device using which the first art image can be generated at the second computing device even after the first online session or the second online session expires.

24. The computer-readable storage medium of claim 22 further comprising:
instructions for receiving, by the server computing device, a request from the first computing device for uploading an image of the setting from the second computing device;
instructions for causing the second computing device to capture the image of the setting and copy the image of the setting automatically from the second online session to the first online session; and
instructions for generating, by the server computing device and in the first online session, the image of the setting at the first computing device.

25. The computer-readable storage medium of claim 24 further comprising:
instructions for generating, by the server computing device and at the first computing device, the first art image, wherein the first art image is overlaid on the image of the setting.

26. The computer-readable storage medium of claim 22, wherein the access information includes a link, which when accessed using the second computing device, initiates the second online session.

27. The computer-readable storage medium of claim 22, wherein the access information includes an access code, which when input at the second computing device, initiates the second online session.

28. The computer-readable storage medium of claim 22, wherein the instructions for generating the first art image include instructions for determining, based on an analysis of an image of the setting, at least one of a white balance correction factor or a size correction factor to be applied to the first art image.

29. The computer-readable storage medium of claim 28, wherein the instructions for determining include instructions for determining the at least one of the white balance correction factor or the size correction factor based on a marker object in the setting whose size and color is predefined.

30. The computer-readable storage medium of claim 28, wherein the instructions for generating the first art image include instructions for adjusting a white balance of the first art image based on the white balance correction factor.

31. The computer-readable storage medium of claim 28, wherein the instructions for generating the first art image include instructions for resizing the first art image based on the size correction factor.

32. A computer system comprising:
a processor; and
a memory having instructions executable by the processor to cause the processor to:
generate a first online session between a server computing device and a first computing device to enable a user to access a plurality of images stored at the server computing device using the first computing device, each of the plurality of images representing an art object;
establish access information of online sessions at the server computing device, to establish a second online session between the server computing device and a second computing device using the access information, wherein the second online session is connected to the first online session by generating a unique storage address for storing the second session data and making the second session data automatically available to the first session without any intervention from the user;

receive an image of a setting in the second online session, wherein the image of the setting is uploaded from the second computing device, and wherein the third module is further configured to copy the image of the setting from the second online session to the first online session at the server computing device, and the image of the setting representing a physical surrounding for placing art objects;

render a first image of the images and the image of the setting at the first computing device, wherein the first module is further configured to overlay the first image on the image of the setting, the first image selected by the user to simulate the art object placed within the physical surrounding represented by the image of the setting.

33. A method comprising:

generating, by a server computing device, a first online session between the server computing device and a first computing device to receive a user selection of a selected artwork from among a plurality of artworks;

generating, by the server computing device, access information for uploading a specified digital asset to the server computing device from a second computing device;

generating, by the server computing device, a second online session between the server computing device and the second computing device using the access information, the second online session being connected to the first online session by generating a unique storage address for storing the second session data and making the second session data automatically available to the first session without any intervention from the user;

receiving, at the server computing device, the specified digital asset from the first computing device as part of the first online session; and generating, by the server computing device, a rendered image combining the selected artwork and the specified digital asset from the first computing device in the first online session.

34. The method of claim 33, wherein the server computing device receives the specified digital asset from the first computing device by generating a unique storage address for storing session data of the second online session, the unique storage address accessible by the first online session.

35. A computer system comprising:

a processor; and a memory having instructions executable by the processor to cause the processor to:

establish a first online session between a server computing device and a first computing device to enable a user to select an image from a plurality of images, each of the plurality of images representing an art object;

establish a second online session between the server computing device and a second computing device using access information generated by the server, the second online session being connected to the first online session by generating a unique storage address for storing the second session data and making the second session data automatically available to the first session without any intervention from the user;

receive an image of a setting, from the second computing device via the second online session, to copy the image of the setting from the second online session to the first online session at the server computing device, the image of the setting representing a physical surrounding for placing art objects;

render a first image of the images and the image of the setting at the first computing device, wherein the first module is further configured to overlay the first image on the image of the setting.

* * * * *